May 31, 1938.  E. H. THOMPSON  2,118,871
CHECK WRITER
Filed Aug. 3, 1936  6 Sheets-Sheet 3

Inventor:
Ernest H. Thompson,
By Brown, Jackson, Boettcher & Dienner
Attys.

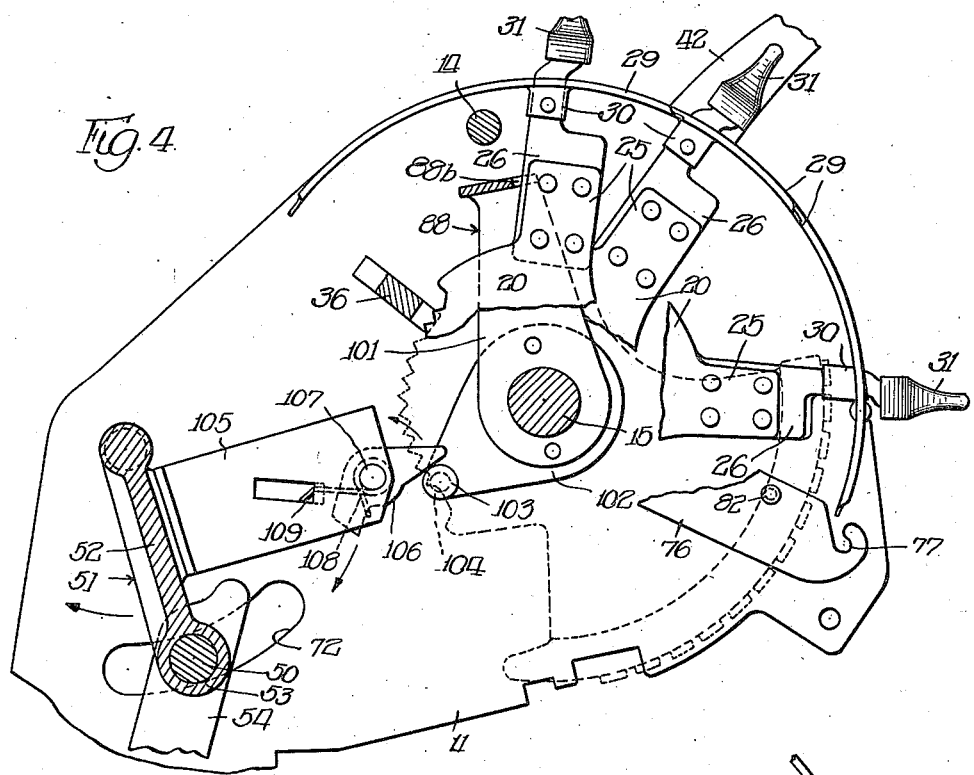
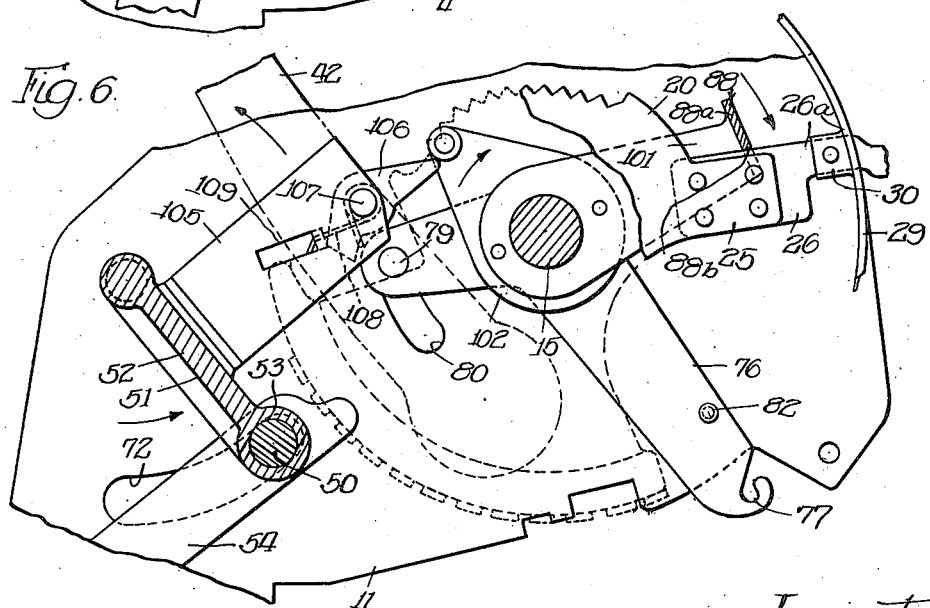

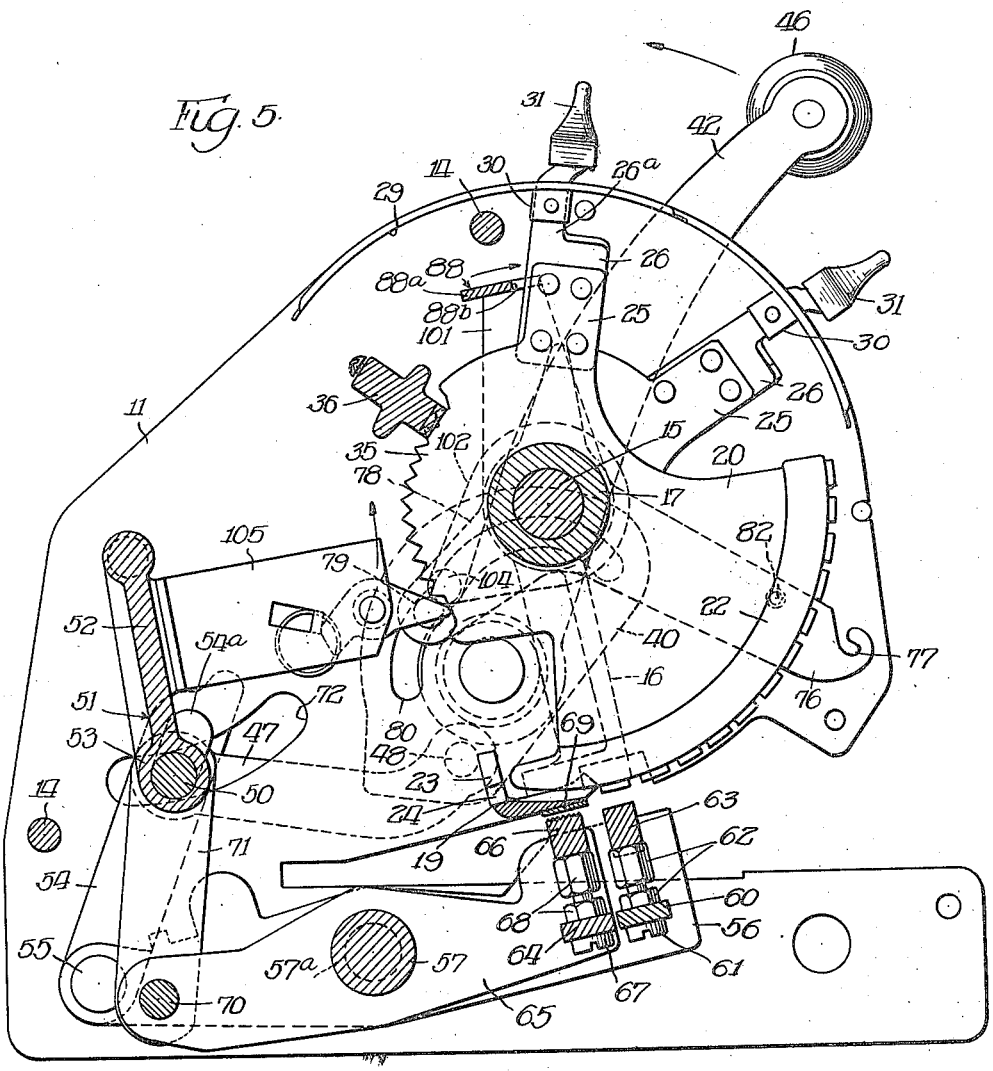

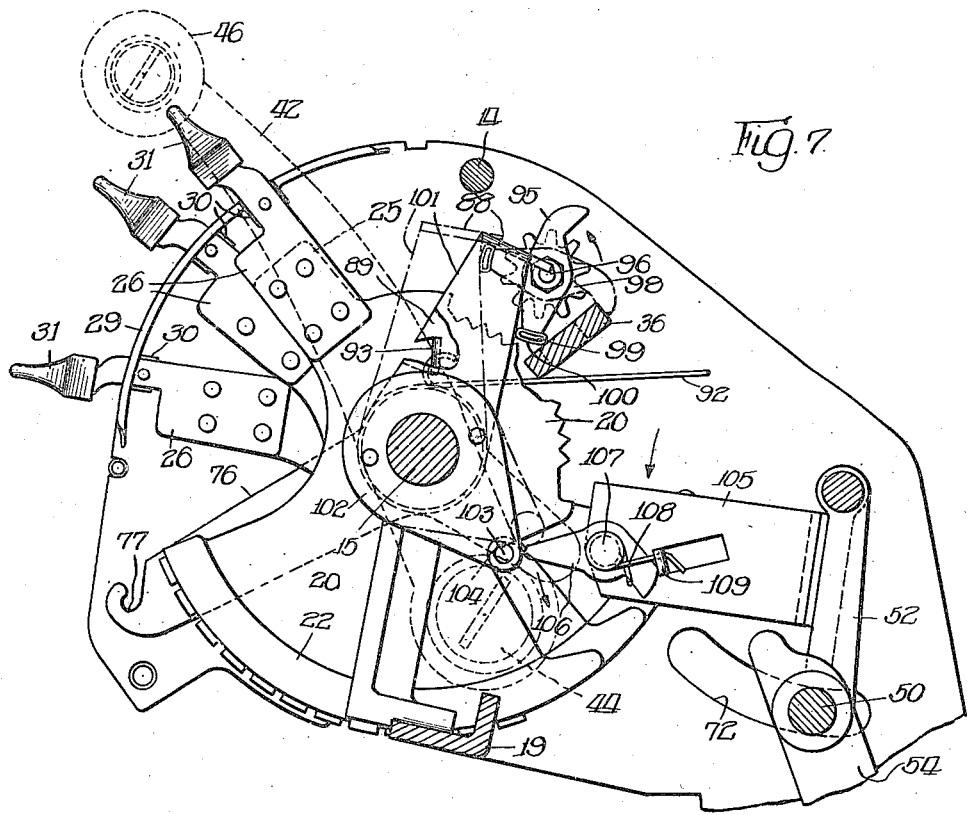
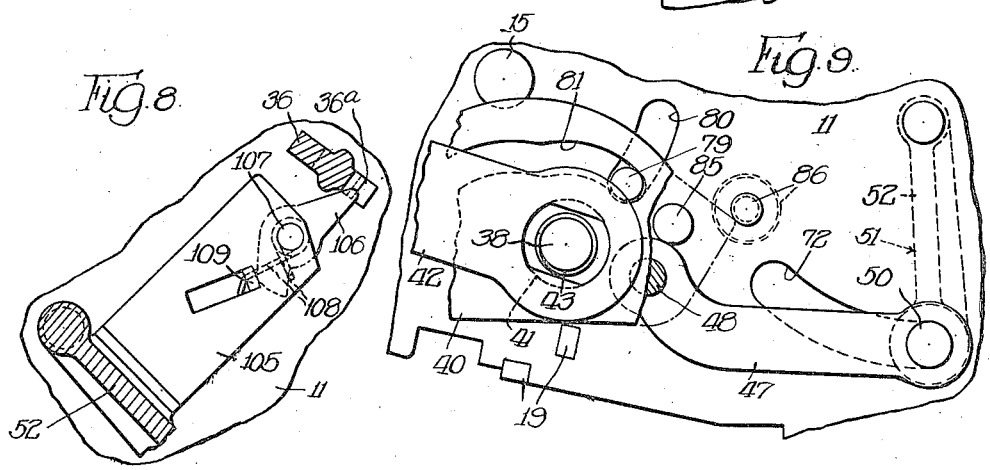

Patented May 31, 1938

2,118,871

UNITED STATES PATENT OFFICE 2,118,871

CHECK WRITER

Ernest H. Thompson, Winnetka, Ill., assignor to International Register Company, Chicago, Ill., a corporation of Illinois Application August 3, 1936, Serial No. 94,020

14 Claims. (Cl. 101—95)

This invention relates to machines for writing or printing checks and like instruments, and has to do with a machine employing independently adjustable printing members and clearing means for restoring such members to normal position after completion of a printing operation.

The machine is, in general, similar in construction and operation to the check writer disclosed in Patent No. 1,909,141, issued May 16, 1933, to Arthur H. Woodward and William E. Richmond. The instant invention relates to the clearing means, to which the description will be particularly directed, and such features of the machine as are disclosed in the above identified patent and which do not bear directly upon the clearing means need not be illustrated nor described here in detail.

One of the main objects of my invention is to provide automatic clearing means whereby the printing members are returned to normal position, ineffective for printing a check, after completion of a printing operation. A further object is to provide means for optionally enabling and disabling the clearing means whereby, if desired, a plurality of checks, each for the same amount, may be printed successively without necessity for resetting the printing members or segments for each check. Further objects and advantages will appear from the detailed description.

In the drawings:

Figure 4 is a sectional view from front to back of the check writer, taken adjacent and looking toward the inner face of the operating lever side plate, certain parts being omitted and parts being broken away, showing the position of the clearing yoke operating pawl when the operating lever has been moved approximately one-half of the distance from inoperative position to full operative position;

Figure 5 is a sectional view, taken substantially on line 5—5 of Figure 3, but showing the position of the clearing yoke operating pawl when the operating lever has been moved approximately one-quarter of the distance from full operative position to inoperative position;

Figure 6 is a view similar to Figure 4, but showing the positions of the clearing yoke and the operating pawl therefor slightly before the operating lever reaches full inoperative position in its return movement;

Figure 7 is a sectional view taken substantially on line 7—7 of Figure 3, with parts broken away and certain parts omitted, showing the clearing yoke operating pawl in approximately its position shown in Figure 5 and the clearing yoke in inoperative position;

Figure 1:
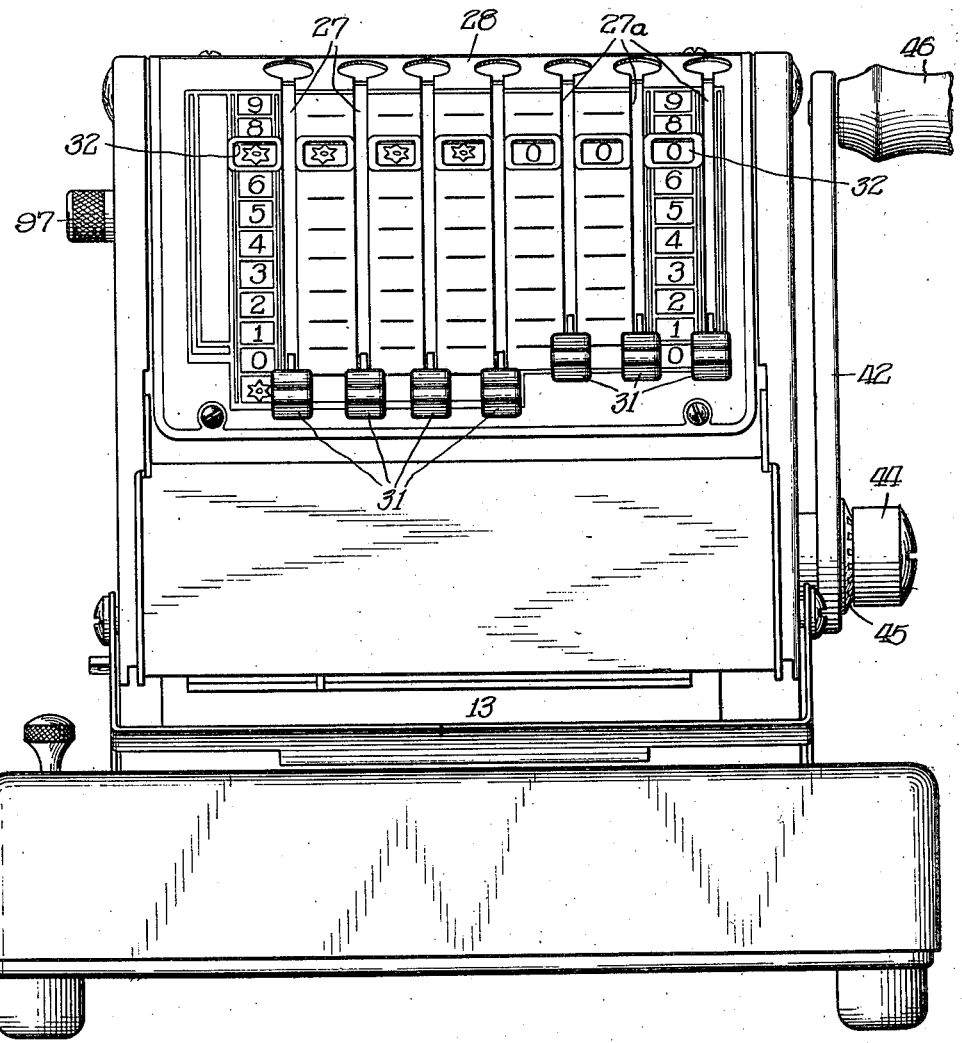
Figure 1 is a front view of a check writer embodying my invention.

Figure 8 is a fragmentary detail view, looking toward the inner face of the operating lever side plate, partly in section, showing the clearing yoke operating pawl in normal position; and Figure 9 is a fragmentary side view of the check writer, with the casing thereof removed, looking at the operating lever side, with the operating lever in full operative position, parts being broken away and certain parts being removed.

The machine includes an enclosing casing which may be constructed and mounted thereon in the same manner as in the above identified patent, and need not be illustrated nor described in detail. The main frame of the machine comprises side plates 10 and 11 of irregular polygonal shape, each of these plates being provided with a forwardly extending base element 12 which defines, with the body portion of the plate, a rearwardly extending slot 13 for insertion of the check or like paper, into the machine. These plates are secured together, in spaced relation, by the spacing rods 14 suitably secured through the plates.

A shaft 15 is rockably mounted in plates 11 and 12 and is confined against relative endwise movement in a suitable manner, conveniently by having its portions reduced to form end studs which extend through these plates, providing shoulders on the shaft contacting the inner faces of the plates. A "sum" bar 16, a "dollars" bar 17, and a "cents" bar 18 are mounted at their upper ends upon the shaft 15, each of these bars being provided with a sleeve which fits snugly about the shaft. The bars 16, 17 and 18 are suitably secured, at their lower ends, to a guide bar 19 which extends transversely of the main frame and has its end portions suitably secured in the plates 10 and 11.

The printing line of the machine is the line defined by the bars 16, 17 and 18, and the segments which carry the printing characters are individually adjusted to align such characters on this printing line. Bar 17 bears upon its lower or printing face the abreviation "Dol's" for dollars, and the bar 18 bears upon its printing face the characters "Cts", constituting the abbreviation for cents. Preferably, bar 16 is provided, at its lower end, with a removable plate providing a printing surface bearings the words "The Sum". This plate may be mounted at the lower end of bar 16 in any suitable or preferred manner, but is preferably mounted in the manner disclosed in the above identified patent to Arthur H. Woodward and William E. Richmond. The printing characters of the bars 16, 17 and 18, and of the printing segments, are serrated and cooperate with a serrated platen for perforating the paper or material of the checks, in a known manner.

A plurality of type segments 20 are mounted upon shaft 15 for turning movement thereon, these segments being spaced apart by spacers 21 upon the shaft. I have shown five segments between the bars 16 and 17, these segments being held against movement endwise on the shaft by the spacers 21 and the sleeves at the upper ends of bars 16 and 17. Two printing segments 20 are disposed between the sleeves at the upper ends of bars 17 and 18 and are mounted upon the shaft in the same manner as the segments between bars 16 and 17. An arcuate type bar 22 is suitably secured to the edge portion of each segment for movement therewith. This bar is provided, upon its printing face, with a series of characters ranging from 0 to 9 and arranged in seriatim order, there being a spacing character, such as an asterisk or star, preceding the zero or 0 character. Referring more particularly to Figure 5, the guide bar 19 is provided with a plurality of guide slots 23 extending from front to back thereof, this bar being of approximately L-shape in cross-section. Guide members 24, of channel cross-section, are mounted upon the bar 19 and receive the type bars 22 of the respective segments 20 so as to guide the segments in the movement thereof and hold them against objectionable lateral play or movement. In this connection, it will be noted that the forward edge of the guide bar 19 is disposed adjacent the printing line of the machine, determined by the bars 16, 17 and 18. The characters which are used for printing in a given printing operation are those which are disposed in alignment immediately in front of the forward edge of the guide bar. This is advantageous, as assuring that the type characters used in the printing operation are effectively held against any objectionable looseness or play during the printing operation, thus assuring accuracy.

Each segment 20 is provided with a forwardly projecting finger 25 to which is riveted or otherwise suitably secured a grip member 26. Each of the grip members is suitably shaped and disposed to project through a slot 27 in an index plate 28 which is suitably secured to and forms a part of the enclosing casing. A number strip 29 is suitably secured to member 26, as by means of a tab 30 of channel cross-section formed integrally with the strip and fitting about element 26a of member 26, which element is reduced in width and projects through slot 27, the channel element 30 being riveted to element 26a. At its outer end, element 26a is provided with a suitable grip 31. The strip 29 is disposed concentrically with shaft 15, as is plate 28, and is marked correspondingly to the arrangement of the characters upon the type bar 22. Plate 28 is provided, adjacent each side thereof, (Fig. 1), with a series of characters corresponding to the characters of the respective type bars 22, but arranged reversely thereto. Between these two series of characters the front of plate 28 is divided into a plurality of vertical series of spaces, corresponding to the numbers of the series adjacent each side of the plate and aligned transversely thereof with such numbers. Plate 28 is further provided, adjacent each slot 27 thereof, with an opening 32 for observation of the strip 29 which is disposed to move beneath such opening. The number strips 29 are so disposed that the number or character visible through the opening 32 corresponds to the character of the associated type bar which is disposed upon the printing line of the machine. Also, the element 26a of grip member 26 is so disposed as to be aligned with that character of the series of characters, or corresponding spaces, adjacent slot 27 of plate 28 which corresponds to the character of the type bar which is in position upon the printing line. This provides simple and efficient means for accurately determining the set of the respective printing or type segments.

The printing segments 20, being loose upon the shaft 15, are independently adjustable on a common axis for selective alignment of the printing characters of the type bars 22 on the printing line of the machine, this independent adjustment of the segments being accomplished by direct movement thereof through the manual operation of member 26. Each segment 20 is provided with a two-way rack 35 formed by cutting teeth in the hub portion of the segment. An index bar 36 is suitably secured at its ends in the plates 10 and 11, this bar being disposed in rear of and above the shaft 15. Bar 36 is slotted for reception of rack 35 and is provided with means cooperating therewith for releasably holding the segment 20 in adjusted position. This means may be the spring-pressed ball detent means disclosed in the above identified patent to Arthur H. Woodward and William E. Richmond, or any other suitable or equivalent means. The shoulder at the rearward end of the rack 35 is disposed to contact bar 36 so as to limit turning of segment 20 in clockwise direction, as viewed in Figure 5, beyond that position in which the segment is ineffective for printing a check. When the finger grip 31 is in its lowermost position, the associated segment is in such position that the first character or asterisk thereof is disposed on the printing line of the machine. This is true of the segments disposed between the bars 16 and 17, with the exception of the segment immediately adjacent bar 17. This latter segment, and the segments between bars 17 and 18, which may be referred to as the cents segments, are incapable of being turned into position to bring the asterisk thereof in position on the printing line, since the three slots 27a of the plate 28, at the right hand side thereof, are somewhat shorter than the slots 27. The length of the slots 27a is such that the zero or 0 characters of the associated segments are disposed on the printing line when the finger grip of such segments have been moved into their lowermost position. In Figure 1 the first four segments are disposed in normal position, with the asterisk thereof on the printing line of the machine, and the last three segments are disposed in normal position with the 0 characters thereof on the printing line of the machine, the segments at this time being all in position ineffective for printing a check, since, as will be obvious from Figure 1, the segments so positioned are incapable of printing any amount or sum other than zero.

A stud shaft 38 is suitably secured through plate 11 and projects beyond the outer face thereof. A cam 40, is suitably mounted upon a hub 41 for turning therewith, this hub being mounted for turning upon stud shaft 38. The outer end of hub 41 is flattened and fits snugly into a corresponding opening through the lower end of an operating lever 42, as shown in Figure 9. Outward beyond its flattened outer portion, hub 41 is reduced in diameter and exteriorly threaded to provide a tubular screw element 43 upon which screws a cap 44, between which and the lower end of lever 42 is confined a lock washer 45 of known type. Lever 42 is thus secured upon hub 41 for turning the same and cam 40, for which purpose the lever is provided, at its upper end, with a suitable handle 46.

An operating link 47 is pivoted at its forward end, at 48, to cam 40 at the inner side thereof and at the lower forward portion of the cam in the normal position of the latter. At its rearward end, link 47 is pivoted to pintle 50 of a toggle link structure 51 shown more clearly in Figure 5. This toggle link structure includes an upper leaf 52 which is pivotally mounted, at its upper edge, in plates 10 and 11. Leaf member 52 is provided, at the lower edge and adjacent each end thereof, with spaced sleeves 53 through which the pintle 50 passes. Links 54 are loosely mounted at their upper ends upon pintle 50 adjacent the outer ends of the sleeves 53. At their lower ends these links are pivoted, at 55, to arms 56 rockably mounted upon reduced elements 57a of a shaft 57 suitably mounted in side plates 10 and 11. Each of the links 54 is slotted at 54a for reception of pintle 50, to provide a lost motion connection between the latter and links 54 for a purpose which will be described presently.

Referring to Figure 5, a bar 60 is mounted between arms 56, at the forward ends thereof, and provides, in conjunction with screws 61 and nuts 62, means for adjustably mounting a platen 63 which fits, at its ends, into slots in arms 56 extending from the upper edges thereof. This platen cooperates with the printing characters of the segments 20 and of bars 16, 17 and 18, for effecting the printing operation.

A bar 64 is suitably secured between the forward ends of arms 65 mounted on shaft 57 for rocking movement about the axis thereof, arms 65 being disposed inside of arms 56 and the two pairs of arms being capable of independent rocking movement. A perforating bar 66 is supported from bar 64, by means of screws 67 and cooperating nuts 68, and cooperates with a perforating plate 69 suitably mounted at the under face of guide bar 19. Arms 65 are connected, at their rearward ends, by a pintle rod 70 passing therethrough and secured, at its ends, through the lower ends of links 71 pivoted at their upper ends on pintle 50.

Figure 2:
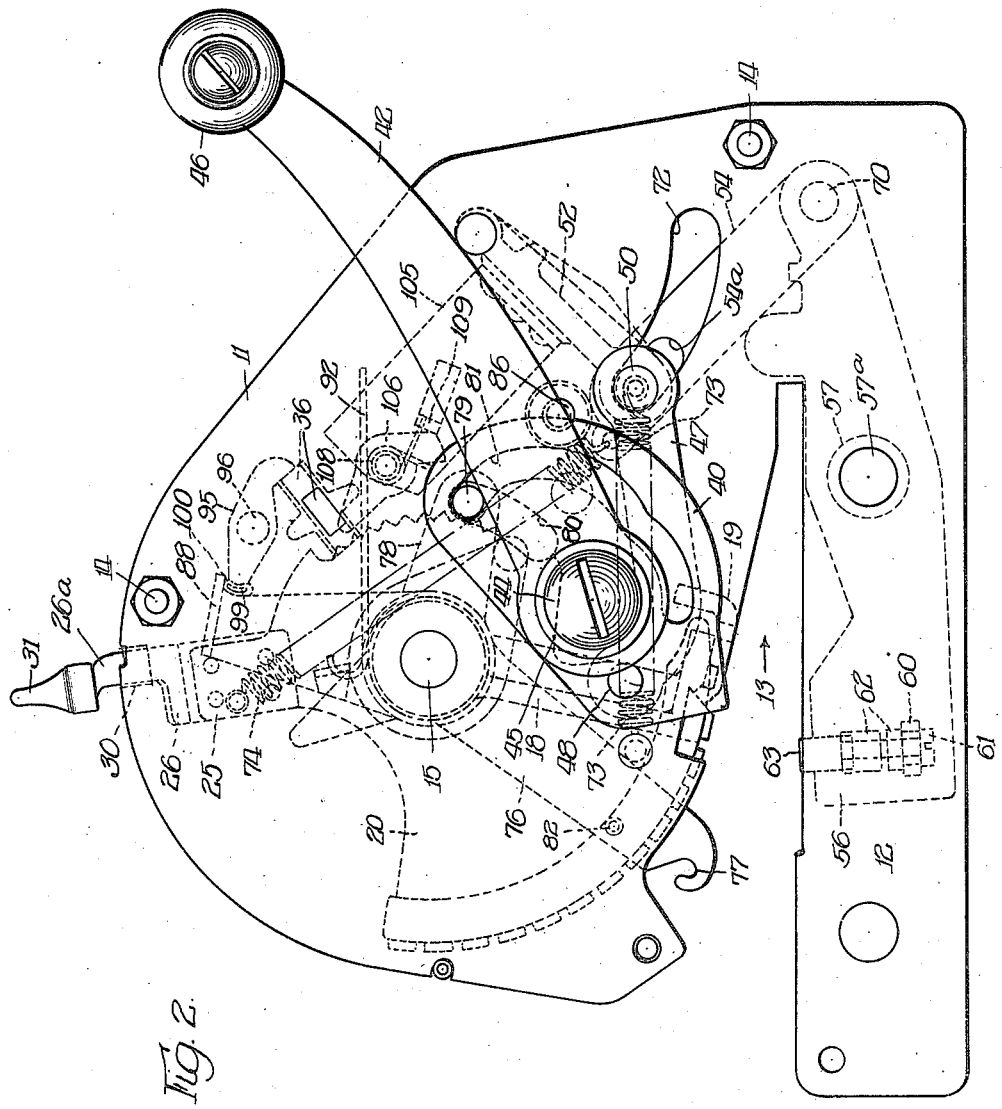
Figure 2 is a side view of the check writer, with the casing therefor removed, looking at the operating lever side, with the inking mechanism and certain other parts omitted for clearness of illustration, and the operating lever in normal position.
Figure 3:
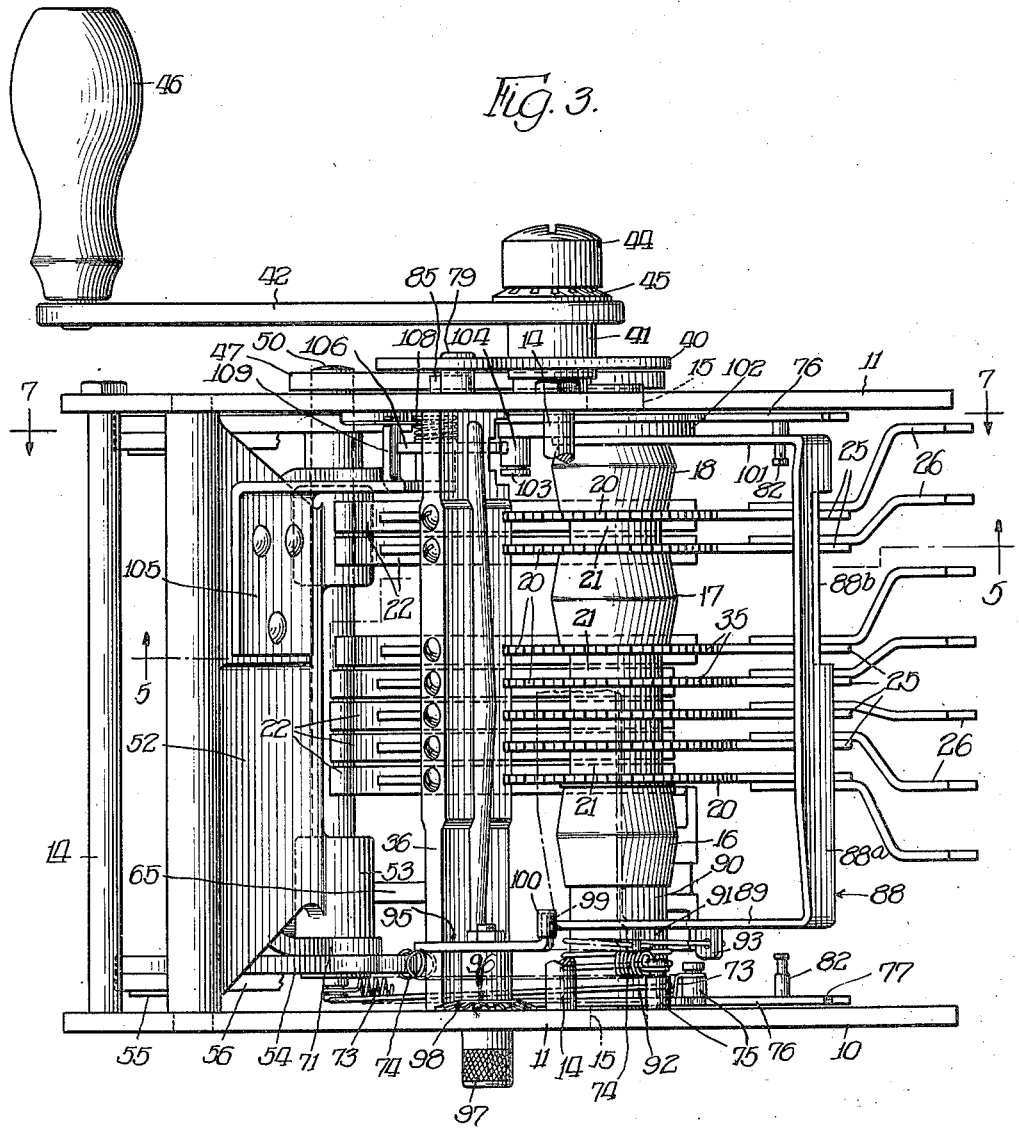
Figure 3 is a plan view of the check writer of Figure 2, with the clearing yoke swung downward and forward into approximately clearing position.

The end portion of pintle 50 to which link 47 is pivoted passes through an arcuate slot 72 in side plate 11. In the normal rearward position of lever 42, shown in Figure 2, pintle 50 is at the forward end of slot 72, the toggle is broken or collapsed, and the platen 63 and the perforating bar 66 are in lowered position. Two tension springs 73 and 74, secured at their lower ends to pintle 50 and one of the links 54 adjacent frame plate 10, respectively, and anchored at their upper ends to pins 75 secured in plate 11, normally hold the toggle collapsed and the lever 42 in its rearward inoperative position.

The perforating bar 66 is so disposed, relative to platen 63, as to perforate the portion of the check upon which the payee's name is written, the serrated platen 63 cooperating with the serrated printing characters for serrating the portion of the check upon which the sum or amount thereof is printed. During forward movement of lever 42, into operative or printing position, pintle 50, which in the full rearward position of lever 42 is disposed at the upper ends of slots 54a of links 54, moves downward as the toggle is straightened out, thus moving the perforating bar in advance of the platen 63. When pintle 50 reaches the lower ends of slots 54a the platen 63 is moved upward into printing position. In this manner, the perforating bar 66 first perforates the payee portion of the check and holds it in position during the printing operation.

Two arms 76 are secured on shaft 15 adjacent the frame plates 10 and 11, at the inner faces thereof. These arms are provided, at their lower ends, with hook elements 77 intended to support inking means for movement over the printing characters aligned on the printing line of the machine. The inking mechanism may be constructed and operated in the manner disclosed in the above identified patent to Arthur H. Woodward and William E. Richmond, and need not be illustrated nor described herein in detail. Suffice it to state that suitable inking mechanism is provided for inking the characters on the printing line of the machine. Each of the arms 66 is provided with a rearwardly and downwardly extending finger 78. A pin 79 is secured through finger 78 of arm 76 adjacent the inner face of plate 11 and projects through an arcuate slot 80 in the latter plate. Pin 79 also projects through a cam slot 81 in cam 40. Slot 81 is so shaped and disposed that, during the first part of the forward movement of lever 42, the inking assembly is effective for inking the printing characters on the printing line of the machine and, in the continued movement of lever 42 forward, is moved upward and forward by the inking arms 76 so as to permit of the printing operation being performed in the manner previously described. Each of the arms 76 is provided, adjacent the hook element 77 thereof, with a headed pin 82 intended for cooperation with the hook element and an element of the inking assembly for supporting the latter.

When operating lever 42 is in its full forward operative position, the forward end of link 47 contacts a stud 85 secured in plate 11 in rear of cam 40, as shown in Figure 9. In the full rearward or inoperative position of lever 42, the upper end of link 54 adjacent plate 11 contacts a stud 86 secured in plate 11, at the inner face thereof, as in Figure 2. In this manner, the extent of folding or collapsing of the toggle structure is limited, and the movement of the operating lever 42 in either direction is also positively limited.

Ordinarily, after a printing operation, all of the printing segments should be returned to normal or ineffective position. For this purpose I provide a clearing yoke 88 of inverted U-shape, the arms of which are loosely mounted upon shaft 15. One arm 89 of this yoke is confined between a spacing collar 90 at the outer end of the sleeve of bar 16 and a spacing collar 91 contacting, at its outer end, the inner face of inking arm 76 disposed adjacent side plate 10. The collars 90 and 91 are loose upon shaft 15. A torsion spring 92 is mounted about collar 91, has one end hooked through a tab 93 struck outwardly from arm 89 of yoke 88, and has its other end portion extended beneath bar 36. Spring 92 urges yoke 88 upward and rearward in a clockwise direction, as viewed in Figure 7. Rearward movement of yoke 88 is limited by a stop member 95 secured upon the inner end of a rod 96 which is reduced in diameter at its outer portion and passes through side plate 10, a knurled knob 97 being suitably secured upon the outer end of this rod, there being a spring washer 98 of known type confined between the outer end of the body of rod 96 and the inner face of plate 11.

Stop member 95 is provided, at its forward end, with a finger 99 bent inward at right angles to the body of member 95, this finger having placed thereon a tubular cushion member 100, of rubber or other suitable material. In the normal position of member 95 the rearward end thereof contacts bar 36, from which member 95 extends upward and forward at a slight inclination, with finger 99 so disposed as to hold yoke 88 in its normal operative position indicated by the dot and dash lines in Figure 7. In the latter figure the normal position of stop member 95 is also indicated in dot and dash lines, and this member is shown in full lines in its inoperative position, into which it is turned in a clockwise direction from its normal position. In the latter position of member 95 the yoke 88 occupies the full line position shown, in rear of its normal position, and is then in inoperative position, as will be more fully explained presently.

The other arm 101 of yoke 88 has its inner face in contact with the outer end of the sleeve at the upper end of bar 18. An operating arm 102 is riveted or otherwise suitably secured to arm 101, at the outer face thereof, for turning movement therewith about shaft 15. Arm 102 extends downward and rearward from arm 101 and is provided, at its rearward end, with a headed pin 103 upon which is mounted a roller 104, this pin and roller projecting from the inner face of arm 102 parallel to shaft 15. Bight element 88a of yoke 88 straddles the printing segments and is disposed to contact projections 26 thereof in the downward and forward movement of the yoke, it being noted that bight portion 88a is provided with a notch 88b for contact with the projections of the cents and the first dollar segments, this notch being of such depth that the three right-hand segments, as viewed in Figure 1, are returned to their normal positions, ineffective for printing, and the four left-hand segments are returned to their normal position, ineffective for printing, shown in Figure 1, upon forward and downward movement of the yoke.

An angle bracket 105 is secured upon the forward face of leaf 52 of the toggle structure, and projects forward therefrom. A pawl 106 is pivoted at 107 on bracket 105 and is urged in a clockwise direction, as viewed in Figures 4 and 5, by a torsion spring 108 mounted about pivot pin 107. One end of spring 108 engages beneath pawl 106 in rear of pivot pin 107, and the other end thereof contacts a tab 109 struck from bracket 105, this tab also limiting turning of the pawl under influence of spring 108, as in Figure 6.

In the normal inoperative position of operating lever 42 leaf 52 occupies the position shown in Figure 8, and pawl 106 is disposed with its nose portion in notch 36a of bar 36. The pawl will then be above roller 104, as will be clear from Figures 4 and 8. When clearing yoke 88 is in its normal operative position, roller 104 is disposed in the path of movement of the pawl, with bracket 105 and leaf 52, in the movement of the latter during extension or straightening of the toggle for effecting the printing operation, by forward and downward movement of lever 42 from its inoperative position to its full operative position.

In the forward and downward movement of lever 42, pawl 106 contacts roller 104 and is rocked counterclockwise in opposition to spring 108, as indicated in Figure 4. In the continued downward movement of lever 42 the pawl passes out of contact with roller 104 and downward below the same for a short distance. In the return movement of the lever 42, pawl 106 contacts roller 104 at the lower portion thereof, as indicated in Figure 5. In the continued return movement of lever 42, operating arm 102 is swung upward and forward, swinging yoke 88 downward and forward from its normal position of Figure 4, into its clearing position shown in Figure 6. This movement of the yoke serves to return all of the printing segments to their normal positions, ineffective for printing, shown in Figure 1. Immediately thereafter, pawl 106 passes out of contact with roller 104, releasing arm 102 and permitting return of yoke 88 to its normal operative position. In this manner, in the normal use of the check writer, the printing segments are returned to ineffective position after each printing operation, and the clearing operation is performed automatically, without necessity of particular care on the part of the operator.

In cases where it is desired to print a number of checks successively for the same amount, clearing of the printing segments, after printing of each check, may be avoided, thus rendering it unnecessary to reset the segments for each check to be printed. This is accomplished by turning the member 95 into its full line position shown in Figure 7, which movement of member 95 is limited by bar 36. With member 95 in this position the clearing yoke 88 is permitted to move rearward into inoperative position, from its normal operative position, thus causing downward and forward movement of roller 104 sufficient to dispose the latter out of the path of movement of pawl 106. This will be clear from Figure 7, in which the position of operating arm 102, when yoke 88 is in inoperative position, is shown in full lines and the directions of movement of pawl 106, bracket 105, and toggle leaf 52 are indicated by the arrows in the continued movement of operating lever 42 into operative position. It will be noted that pawl 106 clears roller 104 and does not pass beneath the latter, so that, during the return movement of the operating lever 42 to inoperative position, yoke 88 is not operated and the clearing operation does not occur. This provides simple and efficient means for optionally enabling and disabling the clearing means, as desired.

I claim:

1. In a check writer of the character described, a plurality of printing segments normally in a predetermined position and individually adjustable about a common axis, adjusting members secured to and projecting outward from said segments, a clearing yoke rockable about said axis, yielding means urging said yoke in one direction and normally holding it in non-clearing position, an operating lever movable from inoperative position into operative position for effecting the printing operation, and means actuated by said lever for rocking said yoke a predetermined distance in the other direction into contact with said adjusting members and turning said segments into normal position and then releasing said yoke, in the return movement of said lever from operative to inoperative position.

2. In a check writer of the character described, a plurality of printing segments normally in a predetermined position and individually adjustable about a common axis, adjusting members secured to and projecting outward from said segments, a clearing yoke rockable about said axis, yielding means urging said yoke in one direction and normally holding it in non-clearing position, an operating lever movable from inoperative position into operative position for effecting the printing operation, means actuated by said lever for rocking said yoke a predetermined distance in the other direction into contact with said adjusting members, and turning said segments into normal position and then releasing said yoke, in the return movement of said lever from operative to inoperative position, and means for optionally adjusting said yoke into and out of operative relation to said lever actuated means.

3. In a check writer of the character described, a shaft, a plurality of printing segments individually adjustable about said shaft, said segments normally being in a predetermined angular position relative to said shaft and having outwardly extending adjusting projections, a clearing yoke rockable about said shaft straddling said segments and having a bight element disposed to contact said projections and restore said segments to normal position in the movement of said yoke a predetermined distance in one direction, yielding means urging said yoke in the other direction and normally holding it in non-clearing position, means limiting movement of said yoke in said other direction, an operating lever movable from inoperative position into operative position for effecting the printing operation, and means for rocking said yoke said distance in said one direction and then releasing it, in the return movement of said lever from operative to inoperative position.

4. In a check writer of the character described, a plurality of printing segments individually adjustable about a common axis, said segments normally being in a predetermined angular position relative to said axis and having adjusting projections, a clearing yoke rockable about said axis straddling said segments and having a bight element disposed to contact said projections and restore said segments to normal position in the forward movement of said yoke a predetermined distance, yielding means urging said yoke rearward, means limiting rearward movement of said yoke, an operating arm rigid with and projecting downward from an arm of said yoke, said operating arm having an abutment projecting therefrom substantially parallel to said axis, a platen cooperating with said segments, platen operating means comprising a toggle having a leaf swinging on an axis in rear of and parallel to said common axis, an operating lever having operating connection to said toggle, yielding means normally holding said toggle collapsed and said lever in inoperative position, and a pawl movable with said leaf and positionable beneath said abutment in the movement of said lever from inoperative position to operative position to effect the printing operation, said pawl contacting said abutment and rocking said yoke forward said predetermined distance and then releasing it, in the return movement of said lever.

5. In a check writer of the character described, a plurality of printing segments individually adjustable about a common axis and normally in a predetermined angular position relative thereto, a clearing yoke extending above and rockable forwardly about said axis for restoring said segments to normal position, yielding means urging said yoke rearward, means limiting rearward movement of said yoke, an operating arm rigid with an arm of said yoke extending downward therefrom and provided with an abutment substantially parallel to said axis, a platen cooperating with said segments, platen operating means comprising a toggle having a leaf swinging on an axis in rear of and parallel to said common axis, an operating lever having operating connection to said toggle, yielding means normally holding said toggle collapsed and said lever in inoperative position, and a pawl movable with said leaf and positionable beneath said abutment in the movement of said lever from inoperative position to operative position to effect the printing operation, said pawl contacting said abutment and rocking said yoke forward and then releasing it, in the return movement of said lever.

6. In a check writer of the character described, a plurality of printing segments individually adjustable about a common axis and normally in a predetermined angular position relative thereto, a clearing yoke extending above and rockable forwardly about said axis for restoring said segments to normal position, yielding means urging said yoke rearward, means limiting rearward movement of said yoke, an operating arm rigid with an arm of said yoke extending downward therefrom and provided with an abutment substantially parallel to said axis, a platen cooperating with said segments, platen operating means comprising a toggle having a leaf swinging on an axis in rear of and parallel to said common axis, an operating lever having operating connection to said toggle, yielding means normally holding said toggle collapsed and said lever in inoperative position, and a pawl movable with said leaf and positionable beneath said abutment in the movement of said lever from inoperative position to operative position to effect the printing operation, said pawl contacting said abutment and rocking said yoke forward and then releasing it, in the return movement of said lever, said yoke limiting means being adjustable for optionally disposing said abutment out of the path of travel of said pawl.

7. In a check writer of the character described, a plurality of printing segments individually adjustable about a common axis and normally in a predetermined angular position relative thereto, adjusting members rigid with and projecting outwardly and forwardly from said segments, a clearing yoke rockable about said axis, yielding means normally holding said yoke in non-clearing position, an operating lever movable from inoperative into operative position for effecting the printing operation, operating means for rocking said yoke about said axis into contact with said adjusting members and turning said segments into normal position and then releasing said yoke, in the return movement of said lever from operative to inoperative position, and means for optionally disabling said yoke operating means.

8. In a check writer of the character described, a plurality of printing segments individually adjustable about a common axis and normally in a predetermined angular position relative thereto, adjusting members rigid with and projecting outwardly and forwardly from said segments, a clearing yoke rockable about said axis, yielding means normally holding said yoke in non-clearing position, an operating lever movable from inoperative into operative position for effecting the printing operation, and operating means for rocking said yoke about said axis into contact with said adjusting members and turning said segments into normal position and then releasing said yoke, in the return movement of said lever from operative to inoperative position.

9. In a check writer of the character described, a substantially horizontal shaft confined against vertical movement, a plurality of printing segments individually adjustable about said shaft and normally in a predetermined angular position relative thereto, said segments having outwardly projecting adjusting members rigid therewith, a clearing yoke rockable about said shaft straddling said segments and having a bight element disposed to contact said members, yielding means normally holding said yoke in non-clearing position, an operating lever movable from inoperative to operative position for effecting the printing operation, and operating means for rocking said yoke about said shaft into contact with said adjusting members and turning said segments into normal position and then releasing said yoke, responsive to return movement of said lever from operative to inoperative position.

10. In a check writer of the character described, a substantially horizontal shaft confined against downward movement, a plurality of printing segments individually adjustable about said shaft and normally in a predetermined angular position relative thereto, said segments having outwardly projecting adjusting members rigid therewith, a rockably mounted clearing yoke having a bight element disposed to contact said members, yielding means normally holding said yoke in non-clearing position, an operating lever movable from inoperative to operative position for effecting the printing operation, and operating means for rocking said yoke about said shaft into contact with said adjusting members and turning said segments into normal position and then releasing said yoke, responsive to movement of said lever subsequent to completion of the printing operation.

11. In a check writer of the character described, a substantially horizontal shaft, a plurality of printing segments individually adjustable about said shaft and normally in a predetermined angular position relative thereto, a cooperating platen movable toward and away from said segments, the latter having adjusting members projecting therefrom, a clearing yoke rockable about said shaft straddling said segments and having a bight element disposed to contact said members, yielding means normally holding said yoke in non-clearing position, an operating lever movable from inoperative to operative position for effecting the printing operation, and operating means for rocking said yoke about said shaft into contact with said adjusting members and turning said segments into normal position and then releasing said yoke, responsive to movement of said lever subsequent to completion of the printing operation.

12. In a check writer of the character described, a substantially horizontal shaft, a plurality of printing segments mounted on and individually adjustable about said shaft and normally in a predetermined angular position relative thereto, a cooperating platen movable toward and away from said segments, the latter having adjusting members projecting therefrom, a clearing yoke rockably mounted on said shaft straddling said segments and having a bight element disposed to contact said members, yielding means normally holding said yoke in non-clearing position, an operating lever movable from inoperative to operative position for effecting the printing operation, and operating means for rocking said yoke about said shaft into contact with said adjusting members and turning said segments into normal position and then releasing said yoke, responsive to movement of said lever subsequent to completion of the printing operation.

13. In a check writer of the character described, a substantially horizontal shaft confined against vertical movement, a plurality of printing segments mounted on and individually adjustable about said shaft, said segments having adjusting members rigid therewith and projecting outwardly and forwardly therefrom, a clearing yoke rockably mounted on said shaft straddling said segments and having a bight element disposed to contact said members, yielding means normally holding said yoke in non-clearing position, an operating lever movable from inoperative to operative position for effecting the printing operation, and operating means for rocking said yoke about said shaft into contact with said adjusting members and turning said segments into normal position and then releasing said yoke, responsive to movement of said lever subsequent to completion of the printing operation.

14. In a check writer of the character described, a substantially horizontal shaft confined against downward movement, a plurality of printing segments mounted on and individually adjustable about said shaft, said segments having adjusting members rigid therewith and projecting outwardly and forwardly therefrom, a clearing yoke rockably mounted on said shaft straddling said segments and having a bight element disposed to contact said members, yielding means normally holding said yoke in non-clearing position, an operating lever movable from inoperative to operative position for effecting the printing operation, operating means for rocking said yoke about said shaft into contact with said adjusting members and turning said segments into normal position and then releasing said yoke, responsive to movement of said lever subsequent to completion of the printing operation, and means for optionally disabling said yoke operating means.

ERNEST H. THOMPSON.